(12) United States Patent
Ito et al.

(10) Patent No.: US 11,194,060 B2
(45) Date of Patent: Dec. 7, 2021

(54) ELECTROMAGNETIC RADIATION DETECTOR AND METHOD

(71) Applicants: UNIVERSITY PUBLIC CORPORATION OSAKA, Osaka (JP); YASU MEDICAL IMAGING TECHNOLOGY CO., LTD., Yasu (JP)

(72) Inventors: Norio Ito, Osaka (JP); Fumiaki Kunimoto, Shiga (JP)

(73) Assignees: UNIVERSITY PUBLIC CORPORATION OSAKA, Osaka (JP); YASU MEDICAL IMAGING TECHNOLOGY CO., LTD., Yasu (JP)

( * ) Notice: Subject to any disclaimer, the term of this patent is extended or adjusted under 35 U.S.C. 154(b) by 0 days.

(21) Appl. No.: 17/046,179

(22) PCT Filed: Apr. 9, 2018

(86) PCT No.: PCT/JP2018/014892
§ 371 (c)(1),
(2) Date: Oct. 8, 2020

(87) PCT Pub. No.: WO2019/198125
PCT Pub. Date: Oct. 17, 2019

(65) Prior Publication Data
US 2021/0173101 A1    Jun. 10, 2021

(51) Int. Cl.
*G01T 1/20* (2006.01)
*G01T 1/172* (2006.01)
*G01T 1/36* (2006.01)

(52) U.S. Cl.
CPC .......... *G01T 1/2008* (2013.01); *G01T 1/172* (2013.01); *G01T 1/36* (2013.01)

(58) Field of Classification Search
CPC .......... G01T 1/2008; G01T 1/172; G01T 1/36
See application file for complete search history.

(56) References Cited

U.S. PATENT DOCUMENTS 3,568,054 A * 3/1971 Ross .......................... G01T 1/36
324/76.12
3,777,144 A 12/1973 Rapkin et al.
(Continued)

FOREIGN PATENT DOCUMENTS

CN        206990810 U  *  2/2018  ............... G01T 1/36
EP        0227216 B1      1/1991
(Continued)

OTHER PUBLICATIONS

Sichuan Nuclear Industry—CN 206990810 U—Google Patents English obtained Aug. 6, 2021 (Year: 2021).*
(Continued)

*Primary Examiner* — David P Porta
*Assistant Examiner* — Jeremy S Valentiner
(74) *Attorney, Agent, or Firm* — Oblon, McClelland, Maier & Neustadt, L.L.P.

(57) ABSTRACT

An electromagnetic radiation detector of an embodiment includes a first scintillation detector that detects incidence of electromagnetic radiation and includes a first scintillator that outputs photons in response to the incidence of electromagnetic radiation; a second scintillation detector that detects scattered electromagnetic radiation exiting from the first scintillation detector, the scattered electromagnetic radiation that occurs inside the first scintillation detector due to Compton scattering of the electromagnetic radiation; and a multi-channel analyzer that performs multi-channel analysis of a result of the detection by the first scintillation detector, the result being other than results of the detection, timing of which is considered to coincide with timing of the detection by the second scintillation detector. The second scintillation detector includes a second scintillator formed by turning scintillator powder into paste and solidifying the paste into a thick film through compression and drying.

6 Claims, 8 Drawing Sheets

(56) References Cited

U.S. PATENT DOCUMENTS

| | | | |
|---|---|---|---|
| 4,841,153 A * | 6/1989 | Wormald | G01V 5/00 |
| | | | 250/390.04 |
| 4,940,901 A | 7/1990 | Henry et al. | |
| 2002/0079455 A1 * | 6/2002 | Wieczorek | G01T 1/2018 |
| | | | 250/367 |
| 2002/0084420 A1 | 7/2002 | Kitaguchi et al. | |
| 2007/0237668 A1 | 10/2007 | Martins Loureiro et al. | |
| 2008/0251728 A1 * | 10/2008 | Madden | G01T 1/202 |
| | | | 250/367 |
| 2010/0072385 A1 | 3/2010 | Peng et al. | |
| 2010/0090115 A1 | 4/2010 | Lerch et al. | |
| 2010/0176303 A1 * | 7/2010 | Motomura | G01T 1/242 |
| | | | 250/370.09 |
| 2019/0025442 A1 * | 1/2019 | Sawamoto | G01T 1/2002 |

FOREIGN PATENT DOCUMENTS

| | | | | |
|---|---|---|---|---|
| JP | 62-15351 A | 5/1987 | | |
| JP | 62-115351 A | 5/1987 | | |
| JP | 1-165984 A | 6/1989 | | |
| JP | 9-101371 A | 4/1997 | | |
| JP | 2001-235546 A | 8/2001 | | |
| JP | 2009-47559 A | 3/2009 | | |
| JP | 2009-525359 A | 7/2009 | | |
| JP | 4601838 B2 * | 12/2010 | | G21C 17/06 |
| JP | 2013-37008 A | 2/2013 | | |
| JP | 2014-190754 A | 10/2014 | | |

OTHER PUBLICATIONS

Toshiba Corp—JP 4601838 B2—Google Patents English obtained Aug. 6, 2021 (Year: 2021).*

International Search Report dated Jul. 3, 2018 in PCT/JP2018/014892 filed Apr. 9, 2018, citing documents AC-AF and AR-AV therein, 2 pages.

Ishikawa, M., et al., "Development of Real-time Thermal Neutron Monitor for Boron Neutron Capture Therapy", Ionizing Radiation, vol. 31, No. 4, 2005, pp. 279-285.

Extended European Search Report dated Sep. 29, 2021 in European Application No. 18914074.2.

* cited by examiner

☆: PHOTON

ELECTROMAGNETIC RADIATION DETECTOR AND METHOD

CROSS-REFERENCE TO RELATED APPLICATIONS

This application is a national stage application of International Application No. PCT/JP2018/014892, filed Apr. 9, 2018, which designates the United States, the entire contents of which are incorporated herein by reference.

TECHNICAL FIELD

Exemplary embodiments according to the present invention relate generally to an electromagnetic radiation detector and an electromagnetic radiation method.

BACKGROUND ART

Conventionally, scintillators, photomultiplier tubes (PMT), and multi-channel analyzers (MCA) are used to find the energy spectrum of electromagnetic radiation through the following procedure.

Entering the scintillator, electromagnetic radiation applies energy to electrons in the scintillator and ionizes them. Resultant secondary electrons are further ionized in avalanching manner. Such ionized and excited electrons are recombined with holes to generate photons, the number of which is proportional to the incident energy.

The generated photons by the scintillator are converted to photoelectrons by the photoelectric surface of the photomultiplier tube due to photoelectric effect.

The photoelectrons, resulting from the conversion by the photoelectric surface of the photomultiplier tube, are amplified inside the photomultiplier tube, output as a current proportional to the incident energy of the electromagnetic radiation, and then converted into voltage pulses.

The voltage pulses resulting from the conversion are counted with the multi-channel analyzer in certain time interval as pulse numbers of respective crest values, to find a pulse-amplitude distribution (energy spectrum).

CITATION LIST

Patent Literature

Patent Document 1: Japanese Patent Application Laid-open Publication No. 2014-190754

Nonpatent Literature 1: Ishikawa et al., "Development of Real-time Thermal Neutron Monitor for Boron Neutron Capture Therapy", Ionizing Radiation Vol. 31 No. 4 (2005) pp. 279-285

SUMMARY OF INVENTION

Problem to be Solved by the Invention

Meanwhile, incident electromagnetic radiation onto the scintillator causes Compton scattering in the substances constituting the scintillator.

Energy bands (energy spectrum part) corresponding to Compton scattering, particularly the ones corresponding to Compton continuums and Compton edges, may include and hide emission spectra other than the ones due to Compton scattering.

Thus, to distinctively identify different kinds of radiation energy sources, their corresponding emission spectra may not be able to be found.

Means for Solving Problem

In view of the above, it is an object of the present invention to provide an electromagnetic radiation detector and an electromagnetic radiation method that can reduce an emission spectrum corresponding to Compton scattering and detect other emission spectra (photoelectric spectra) in a corresponding energy band.

Effect of the Invention

According to one embodiment, in general, an electromagnetic radiation detector includes a first scintillation detector comprising a first scintillator that outputs photons in response to incidence of electromagnetic radiation, the first scintillation detector that detects the incidence of electromagnetic radiation; a second scintillation detector that detects scattered electromagnetic radiation exiting out of the first scintillation detector, the scattered electromagnetic radiation that occurs inside the first scintillation detector due to Compton scattering of the electromagnetic radiation; and a multi-channel analyzer that performs multi-channel analysis of a result of the detection by the first scintillation detector, the result being other than results of the detection, timing of which is considered to coincide with timing of the detection by the second scintillation detector. The second scintillation detector includes a second scintillator that is formed by turning scintillator powder into paste and solidifying the paste into a thick film through compression and drying, so as not to allow transmission of visible light generated by the first scintillator, and that is located adjacent to the first scintillator, to output photons in response to incidence of the scattered electromagnetic radiation from the first scintillator, the scattered electromagnetic radiation that occurs inside the first scintillator due to Compton scattering.

DESCRIPTION OF EMBODIMENTS

Exemplary embodiments are now described in detail with reference to the accompanying drawings.

Prior to the exemplary embodiments, the principle of an electromagnetic radiation detector of an embodiment is described first.

In the following, the principle of an electromagnetic radiation detector which detects a γ-ray as electromagnetic radiation is explained, by way of example.

In a γ-ray detector being the electromagnetic radiation detector, a γ-ray is incident on a scintillator and undergoes various ionization processes to transfer energy to valence electrons on crystal gratings of scintillator crystals, thereby raising the electrons to the conduction band.

At the same time, holes are formed in the valence band after the electrons have been forced out.

As a result, the electrons in the conduction band and the holes in the valence band move freely, and, encountering the holes, the electrons fall from the conduction band to the valence band, releasing energy as light. This results in emission of light.

The following three phenomena occur due to interaction between a γ-ray incident on the scintillator and electrons:
(1) Photoelectric effect;
(2) Compton scattering; and
(3) Electron pair production.

By photoelectric effect, the entire γ-ray energy is transferred to electrons and the γ-ray disappears.

In Compton scattering, the γ-ray energy is partially transferred to electrons as kinetic energy, causing the electrons to be flicked out. The γ-ray travels with the remnant energy in a direction different from the traveling direction, and then attenuates while flicking out other electrons in the scintillator or moves out of the scintillator.

Electron pair production refers to a phenomenon that, when the incident energy of a γ-ray is 1.022 MeV or above, pairs of electrons and positrons are generated by all the γ-ray energy.

Figure 1:
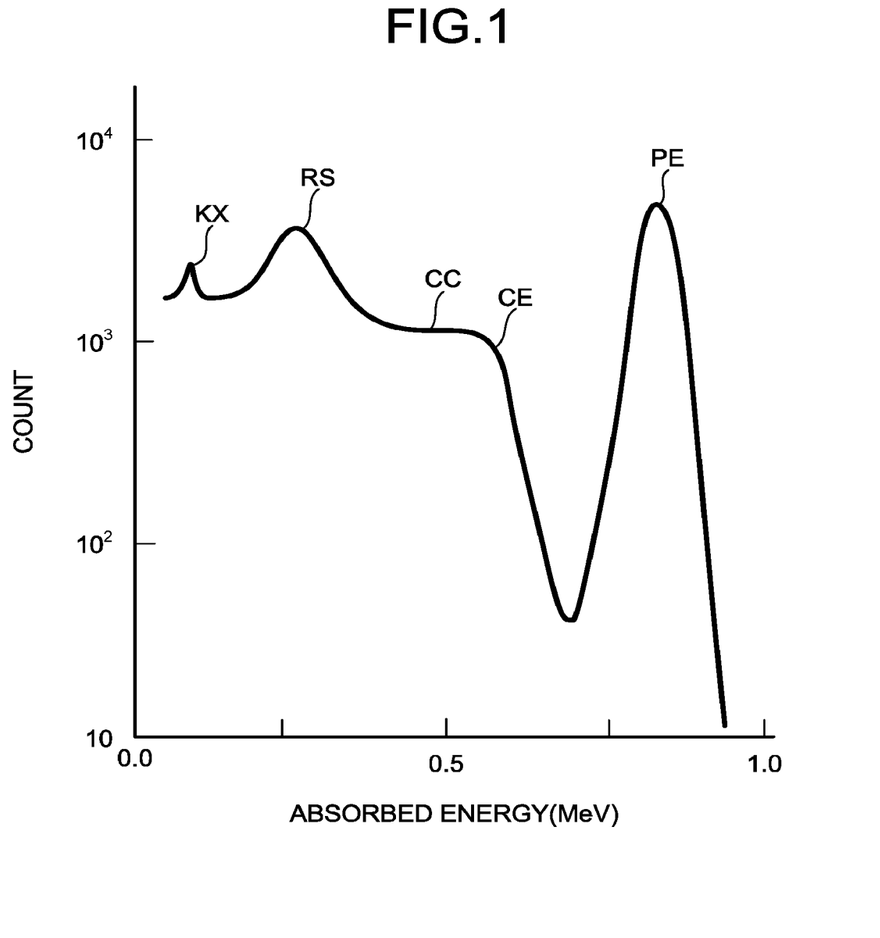
FIG. 1 is an explanatory diagram of exemplary energy spectra in γ-ray detection.

FIG. 1 is an explanatory diagram of exemplary energy spectra in a γ-ray detection.

As illustrated in FIG. 1, energy spectra are resulted from the three phenomena in the γ-ray detection. Examples of the energy spectra include a total absorption peak PE, a Compton continuum CC, a Compton edge CE, a backscatter peak RS, and a KX-ray peak KX.

The total absorption peak (photoelectric peak) PE corresponds to consumption of the entire γ-ray energy including the one after Compton scattering inside the scintillator because of energy transfer to other electrons due to photoelectric effect and Compton scattering.

The Compton continuum CC refers to a continuous emission-energy distribution arising from a continuous distribution of the remaining γ-ray energy transferring to electrons due to the scattering angles between the γ-ray and the electrons, when the γ-ray moves out of the scintillator after Compton scattering while carrying away part of the energy.

The Compton edge CE corresponds to Compton scattering at the scattering angle of 180 degrees, in which the γ-ray transfers the maximum energy to the electrons.

The backscatter peak RS occurs when the γ-ray reacts with a shielding material or a substance around a measurement device, causing Compton scattering, and the γ-ray losing part of the energy is incident on the scintillator and emits light by photoelectric effect.

The KX-ray peak KX corresponds to a light emission by characteristic X-rays when the γ-ray is incident on a surrounding substance and ionizes K-shell electrons of the substance, and outer-orbit electrons drops to vacancies in the K-shell orbits to generate characteristic X-rays.

Meanwhile, energy bands (energy spectra part) corresponding to Compton scattering, particularly, in energy bands corresponding to a Compton continuum CC and a Compton edge CE may include and hide emission spectra other than the ones attributable to Compton scattering.

Thus, for example, to distinctively identify different radiation sources, their corresponding emission spectra may be unable to be found.

In the present embodiment the electromagnetic radiation detector inhibits emission spectra (Compton continuum CC and Compton edge CE) corresponding to Compton scattering and detects other emission spectra in the energy bands concerned.

Specifically, a second scintillator is placed on the incidence surface of a first scintillator for general electromagnetic-radiation detection or on the surface other than a PMT surface. The second scintillator is controlled to detect a γ-ray with a decreased energy after Compton scattering and not to detect light emission (to exclude the light emission from subjects of multi-channel analysis), which would have been detected at this timing. Thereby, the electromagnetic radiation detector detects desired emission spectra while inhibiting the emission spectra (Compton continuum CC and Compton edge CE) corresponding to Compton scattering.

As a result, the electromagnetic radiation detector can detect other emission spectra hidden by the emission spectra due to Compton scattering. To distinctively identify different radiation sources, the electromagnetic radiation detector can ensure detection of their corresponding emission spectra while reducing the influence of Compton scattering.

[1] First Embodiment

Figure 2:
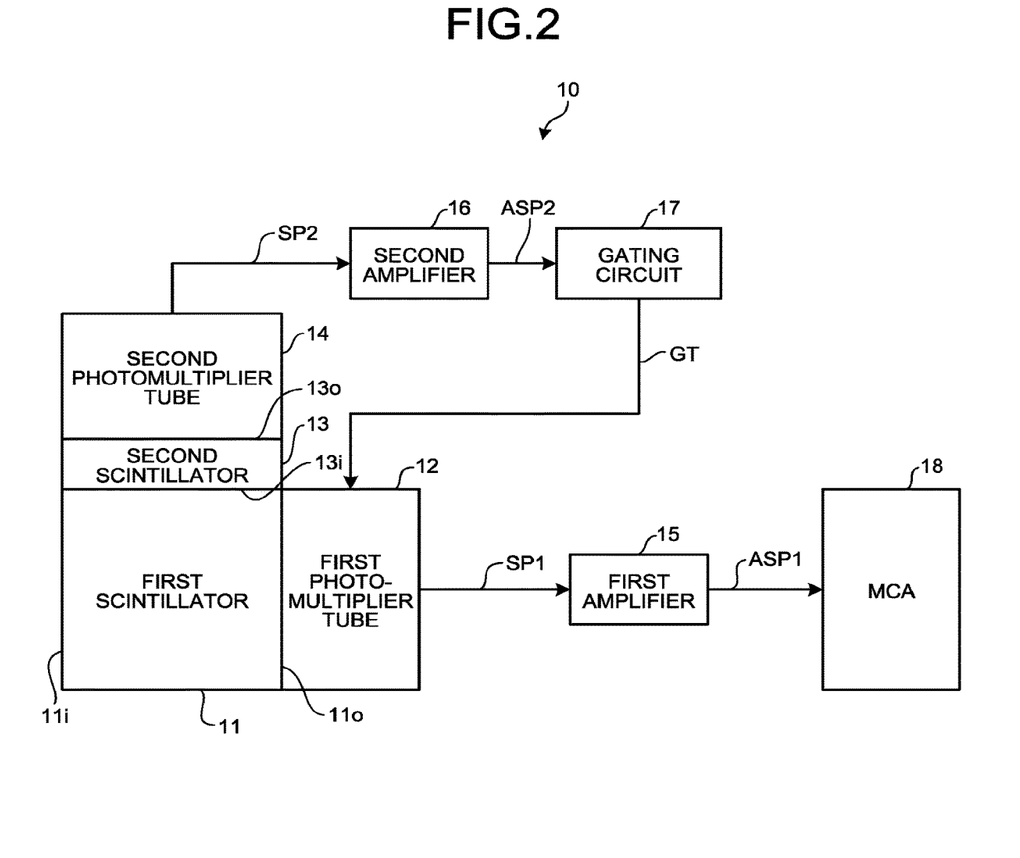
FIG. 2 is a schematic configuration block diagram of a γ-ray detector as an electromagnetic radiation detector according to a first embodiment.

FIG. 2 is a schematic configuration block diagram of a γ-ray detector as an electromagnetic radiation detector according to a first embodiment.

The γ-ray detector 10 includes a first scintillator 11 having an incidence surface 11*i* and an exit surface 11*o* to receive a γ-ray being electromagnetic radiation on the incidence surface 11*i*, emit light by the ionization of the γ-ray, and output photons from the exit surface 11*o*; a first photomultiplier tube 12 that photo-electrically converts the photons output from the exit surface 11*o* of the first scintillator 11 to generate photoelectrons, and multiplies electrons (i.e., amplifies current) to output them as a first pulse-amplitude signal SP1; a second scintillator 13 with an incidence surface 13*i* and an exit surface 13*o*, which does not allow transmission of visible light and receives, on the incidence surface 13*i*, a scattered γ-ray generated from Compton scattering of the γ-ray by the first scintillator 11, emits light by ionization of the γ-ray, and outputs photons from the exit surface 13*o*; a second photomultiplier tube 14 that photo-electrically converts photons from the exit surface 13*o* of the second scintillator 13 to generate photoelectrons, and multiplies electrons (i.e., amplifies current) to output them as a second pulse-amplitude signal SP2; a first amplifier 15 that amplifies the first pulse-amplitude signal SP1 to generate a first amplified pulse-amplitude signal ASP1 for output; a second amplifier 16 that amplifies the second pulse-amplitude signal SP2 to generate a second amplified pulse-amplitude signal ASP2 for output; a gating circuit 17 that interrupts the output from the first photomultiplier tube 12 at the timing at which the second amplified pulse-amplitude signal ASP2 is output, by outputting an interruption control signal GT thereto; and a multi-channel analyzer (MCA) 18 that performs multi-channel analysis of the first amplified pulse-amplitude signal ASP1.

In the above structure, the first scintillator 11, the first photomultiplier tube 12, and the first amplifier 15 constitute a first scintillation detector while the second scintillator 13, the second photomultiplier tube 14, and the second amplifier 16 constitute a second scintillation detector.

Prior to the operation of the γ-ray detector in the first embodiment, the principle of the embodiment is described.

Figure 3:
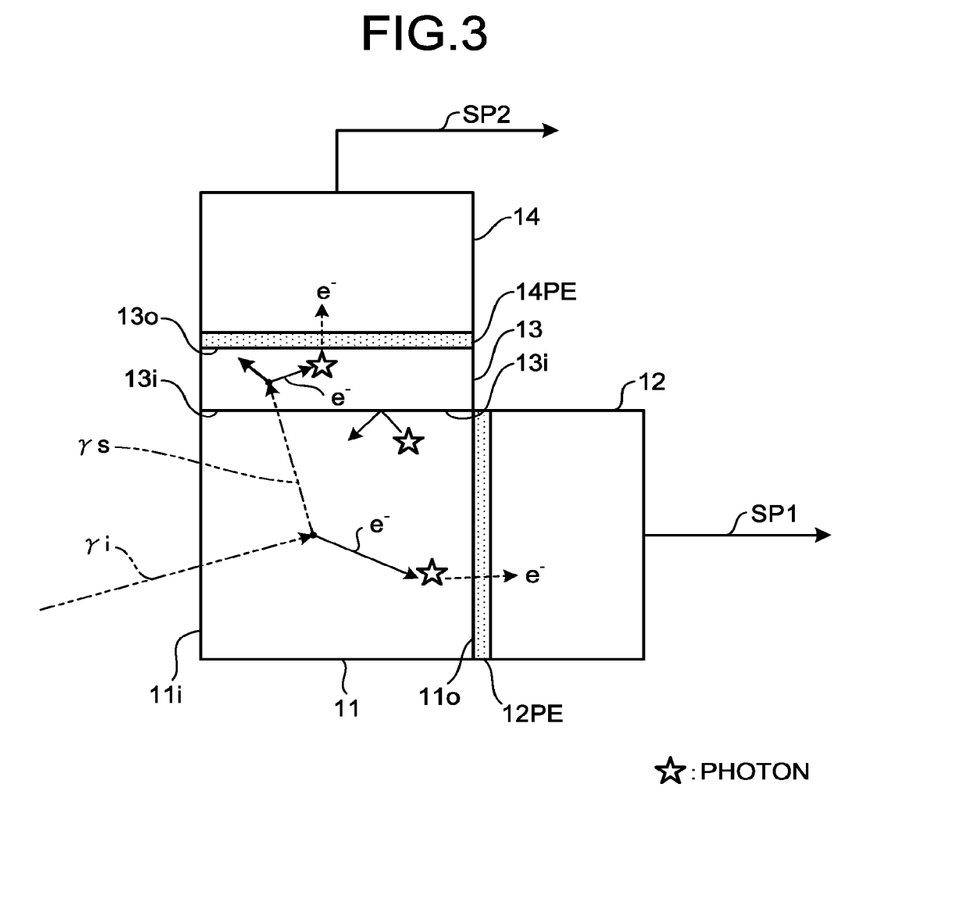
FIG. 3 is an explanatory diagram of the principle of the embodiment.

FIG. 3 is an explanatory diagram of the principle of the embodiment.

An γ-ray γi is incident on the incidence surface 11*i* of the first scintillator 11 and collides with electrons in the first scintillator 11, causing Compton scattering to transfer part of energy to the electrons. The γ-ray γi then excites electrons in the substance of the first scintillator 11 and turns into a scattered γ-ray γs with remaining energy while causing the electrons to transition into a conduction band.

Thereby, the electrons (e−) having transitioned to the conduction band and their corresponding holes move freely in the substance of the first scintillator 11.

Having transitioned into the conduction band, the moving electrons returns to the valence band upon encountering holes, and then generate photons (as indicated by the star symbol in FIG. 3).

The generated photons reach a photoelectric surface 12PE of the first photomultiplier tube 12, and undergo photoelectric conversion to turn into photoelectrons (e−). Then, the electrons undergo electron multiplication in the first photomultiplier tube 12 and are output as a first pulse-amplitude signal SP1.

Part of the generated photons reaches the second scintillator 13 but is not incident on the second scintillator since it does not allow the transmission of visible light.

In contrast, the scattered γ-ray γs generated by Compton scattering enters the second scintillator 13 and collides with electrons therein, exerting Compton scattering or photoelectric effect to transfer part of the energy to the electrons. The scattered γ-ray γs excites electrons included in the substance of the second scintillator 13 and causes the electrons to transition into the conduction band in the end.

Thereby, the electrons (e−) having transitioned into the conduction band and their corresponding holes move freely in the substance of the second scintillator 13.

Having transitioned to the conduction band, the moving electrons return to the valence band upon encountering holes, thereby generating photons. Reaching a photoelectric surface 14PE of the second photomultiplier tube 14, the photons are photo-electrically converted to photoelectrons (e−), and the electrons are multiplied inside the second photomultiplier tube 14 and output as a second pulse-amplitude signal SP2.

This action occurs at an extremely high speed, so that the timing at which the first pulse-amplitude signal SP1 attributable to a Compton scattering event in the first scintillator 11 is output is regarded as coincident with the timing at which the second pulse-amplitude signal SP2 is output.

That is, it is assumed that, statistically, the first pulse-amplitude signal SP1 and the second pulse-amplitude signal SP2 concurrently output are attributable to the same Compton scattering event.

Thus, in response to the output of the second pulse-amplitude signal SP2, the concurrently output first pulse-amplitude signal SP1 is excluded from the subjects of multi-channel analysis by the multi-channel analyzer 18. More specifically, the gating circuit 17 interrupts the output from the first photomultiplier tube 12 at the timing at which the second amplified pulse-amplitude signal ASP2 is output, to thereby reduce count of energy spectra due to Compton scattering.

This results in lowering the count of emission spectra due to Compton scattering, which makes it possible to detect another emission spectrum (photoelectric peak) hidden by the emission spectrum due to Compton scattering. Thus, in distinctively identifying different radiation sources, detection of their corresponding emission spectra can be ensured with reduction in the influence of Compton scattering.

The operation of the γ-ray detector in the first embodiment is described next.

An γ-ray being electromagnetic radiation is incident on the incidence surface 11*i* of the first scintillator 11 in the γ-ray detector 10.

In the first scintillator 11 the incident γ-ray may cause photoelectric effects, or cause Compton scattering but consume all the energy including the one after Compton scattering by transferring all the energy to other electrons, for example. In such a case, by transferring all the energy to electrons, the incident γ-ray disappears. Thus, from the incident γ-ray on the first scintillator 11, no γ-ray is incident on the second scintillator 13.

While the γ-ray causes photoelectric effect or Compton scattering but consumes all the energy including the one after Compton scattering by transferring all the energy to other electrons, each electron, receiving the energy from the γ-ray, moves inside the first scintillator 11 and generates a photon when coupling with a hole. The generated photons are output from the exit surface 11*o* of the first scintillator 11, incident on the first photomultiplier tube 12, and photo-electrically converted thereby to generate photoelectrons and output a first pulse-amplitude signal corresponding to a total absorption peak to the first amplifier 15.

Theoretically, the incident γ-ray with the incident energy of 1.022 MeV or above consumes all the energy for electron pair production of electrons and positrons. The present embodiment considers, however, only the incident γ-ray with no incident energy sufficient for electron pair production, for better understanding.

Meanwhile, the incident γ-ray causes Compton scattering in the first scintillator 11, and transfers part of the energy and flicks out electrons. The γ-ray is thus scattered to become a scattered γ-ray and enters the second scintillator 13.

In this case, the second scintillator 13 does not transmit visible light so that the scattered γ-ray alone is incident thereon.

In the above configuration, to form the second scintillator 13 so as not to transmit visible light generated by the first scintillator 11, scintillator powder can be turned into paste, and the paste is solidified into a thick film through compression and drying. Thereby, the second scintillator 13 with non-transmission to visible light can be attained.

Alternatively, a reflective material that transmits electromagnetic radiation (herein, a γ-ray) and reflects visible light or a non-transmissive material that transmits electromagnetic radiation and transmits no visible light may be placed between the second scintillator 13 and the first scintillator 11.

Meanwhile, each electron, receiving the energy from the γ-ray as a result of Compton scattering, transitions from the valence band to the conduction band, moves inside the first scintillator 11, and returns to the valence band when coupling with a hole, thereby generating photons. The generated photons are output through the exit surface 11*o* of the first scintillator 11, incident on the first photomultiplier tube 12, and photo-electrically converted thereby to generate photoelectrons. As a result, the first pulse-amplitude signal SP1 corresponding to the received γ-ray energy is output to the first amplifier 15.

At the same time, the scattered γ-ray incident on the second scintillator 13 transfers energy to electrons by photoelectric effect or Compton scattering.

Receiving energy from the scattered γ-ray, each electron moves inside the second scintillator 13, transitions from the valence band to the conduction band, and returns to the valence band when coupling with a hole to generate a photon. The generated photons are output from the exit surface 13o of the second scintillator 13, incident on the second photomultiplier tube 14, and photo-electrically converted thereby to generate photoelectrons. As a result, a second pulse-amplitude signal SP2 is output to the second amplifier 16.

The second amplifier 16 amplifies the second pulse-amplitude signal SP2 to output the second amplified pulse-amplitude signal ASP2 to the gating circuit 17.

Consequently, the gating circuit 17 interrupts the output of the first photomultiplier tube 12 at the timing at which the second amplified pulse-amplitude signal ASP2 is output by outputting an interruption control signal GT thereto.

If the output from the first photomultiplier tube 12 is not interrupted at this timing, the first pulse-amplitude signal SP1 of photons corresponding to the electrons given the energy from the incident γ-ray and the scattered γ-ray is to be output to the first amplifier 15. However, the gating circuit 17 blocks the output of the first photomultiplier tube 12, that is, no output of the first pulse-amplitude signal SP1. Consequently, the first pulse-amplitude signal SP1 corresponding to photons with inconstant energy as a result of Compton scattering is prevented from being amplified to the first amplified pulse-amplitude signal ASP1 for output to the multi-channel analyzer 18.

Likewise, the output of the first photomultiplier tube 12 is interrupted each time the second amplified pulse-amplitude signal ASP2 is output to the gating circuit 17. This can relatively reduce the count of the first pulse-amplitude signals due to Compton scattering, that is, the count corresponding to the Compton continuum CC and the Compton edge CE.

Thus, the count of other photoelectric peaks hidden by the count of the Compton continuums CC or the Compton edges CE can be relatively increased, allowing the photoelectric peaks to be identifiable.

A description is now given of the identification of other photoelectric peaks hidden by the count of the Compton continuums CC or the Compton edges CE.

Figure 4:
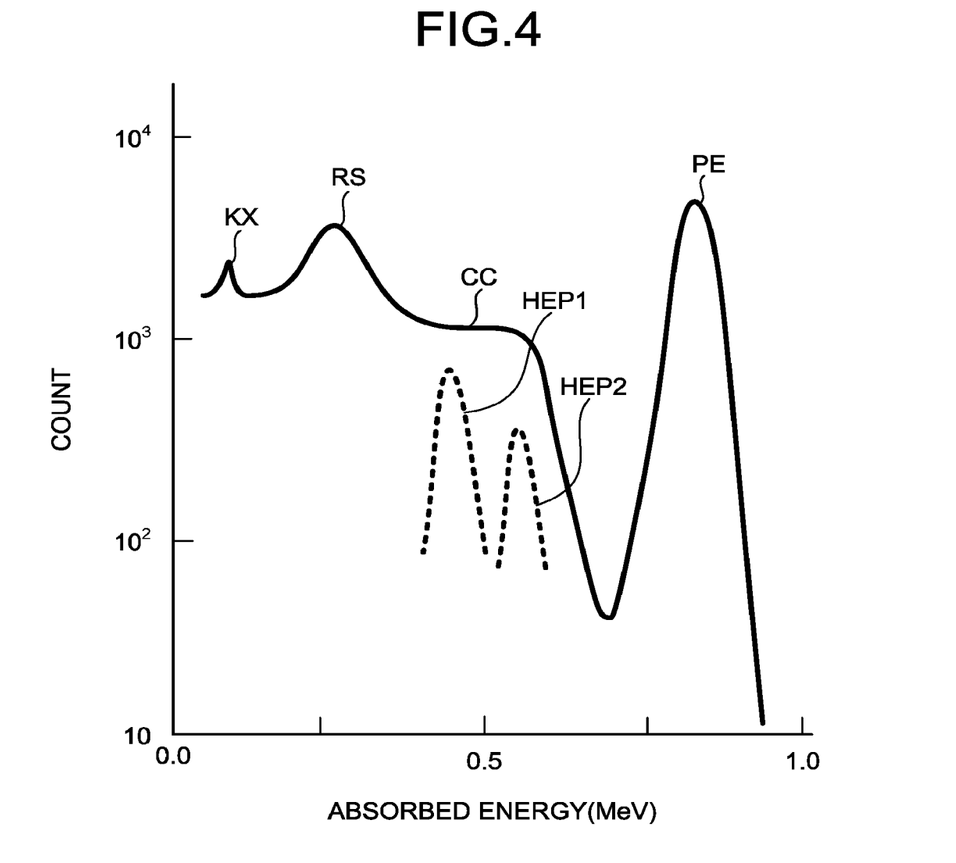
FIG. 4 is an explanatory diagram of hidden photoelectric peaks.

FIG. 4 is an explanatory diagram of hidden photoelectric peaks.

In the case of a normal output from the first photomultiplier tube due to Compton scattering, as illustrated in FIG. 4, two photoelectric peaks HEP1 and HEP2 are overlaid and hidden by the Compton continuum CC or the Compton edge CE.

In this condition, the count of pulse-amplitude signals including the Compton continuum CC and the Compton edge CE due to Compton scattering can be lowered as a whole by decreasing the count of the pulse-amplitude signals attributable to Compton scattering.

Figure 5:
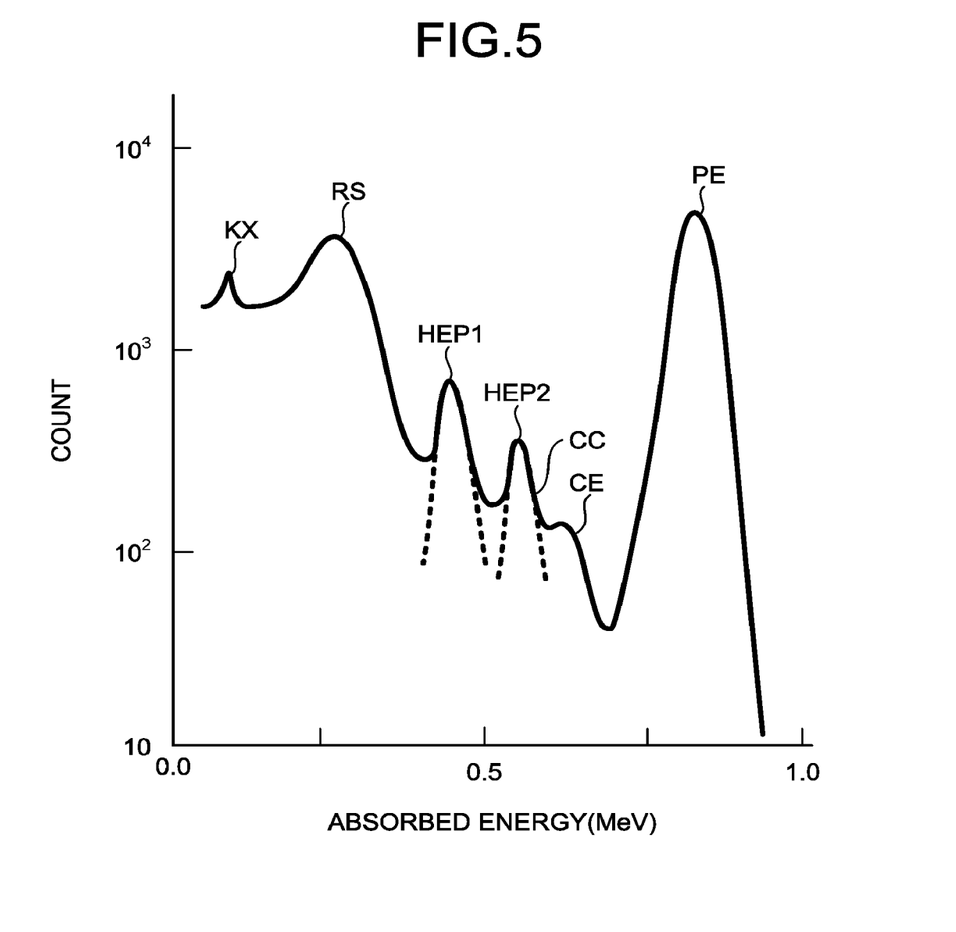
FIG. 5 is an explanatory diagram of manifesting hidden photoelectric peaks.

FIG. 5 is an explanatory diagram of identification of hidden photoelectric peaks.

As illustrated in FIG. 5, thus, the two hidden photoelectric peaks HEP1 and HEP2 become identifiable.

That is, it is made possible to distinguish desired photoelectric peaks, and distinctively identify different radiation sources.

[1.1] Modification of First Embodiment

The first embodiment has described the example of the second scintillator that transmits no visible light. However, the second scintillator can include, on the incidence surface, a filter layer that blocks visible light and transmits γ-rays being electromagnetic radiation.

Owing to such features, the γ-ray detector can exert desired performance regardless of the composition and structure of the second scintillator.

[2] Second Embodiment

A second embodiment is now described.

Figure 6:
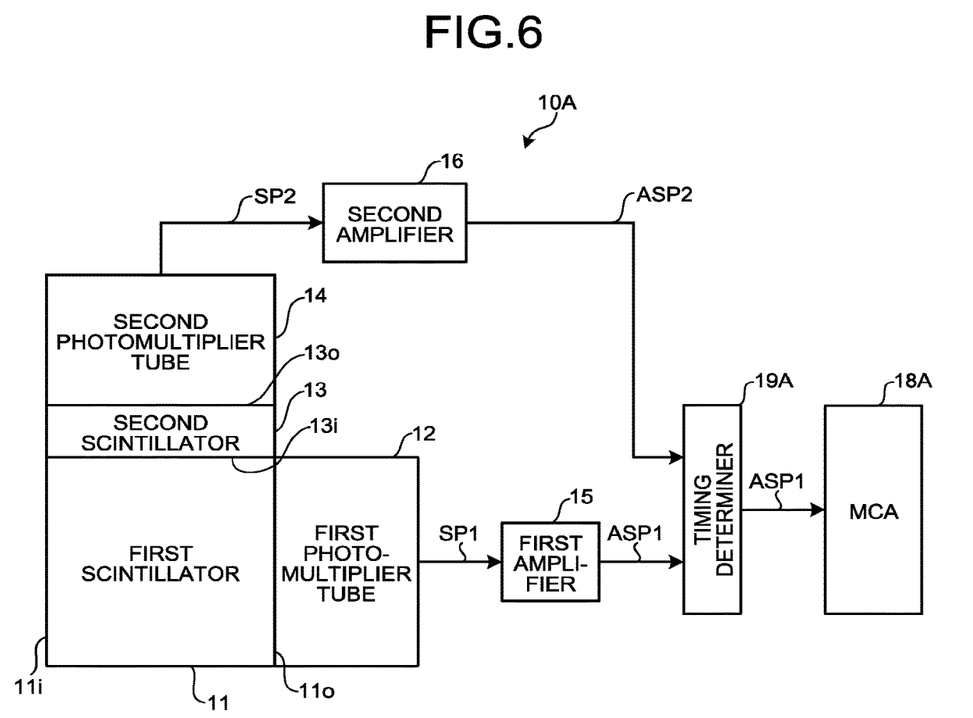
FIG. 6 is a schematic configuration block diagram of a γ-ray detector as an electromagnetic radiation detector according to a second embodiment.

FIG. 6 is a schematic configuration block diagram of a γ-ray detector as an electromagnetic radiation detector in the second embodiment. In FIG. 6, the same or like elements as in FIG. 1 are denoted by the same reference numerals.

The γ-ray detector in FIG. 6 differs from the first embodiment in FIG. 1 in including a timing determiner 19A that implements the function of the gating circuit 17. The timing determiner 19A determines, from the output of the second amplifier 16, whether the first amplified pulse-amplitude signal ASP1 output from the first amplifier 15 is adoptable, and a multi-channel analyzer 18A performs multi-channel analysis of the first amplified pulse-amplitude signal ASP1 as a subject on the basis of a result of the determination.

The operation of the γ-ray detector in the second embodiment is now described.

A γ-ray being electromagnetic radiation is incident on the incidence surface 11i of the first scintillator 11 of a γ-ray detector 10A, and causes photoelectric effect or Compton scattering inside the first scintillator 11 and consumes all the energy including the one after Compton scattering by transferring the energy to other electrons therein. In such a case, generated photons are output from the exit surface 11o of the first scintillator 11, incident on the first photomultiplier tube 12, and photo-electrically converted thereby to photoelectrons. Thereby, a first pulse-amplitude signal corresponding to a total absorption peak is output to the first amplifier 15.

In this process, the incident γ-ray causes Compton scattering in the first scintillator to transfer part of the energy to electrons and flick out the electrons. As a result, the γ-ray is scattered to become a scattered γ-ray and is incident on the second scintillator 13.

Receiving the γ-ray energy by Compton scattering, each electron moves inside the first scintillator 11 and generates a photon when coupling with a hole. The generated photons are output from the exit surface 11o of the first scintillator 11, enter the first photomultiplier tube 12, and are photo-electrically converted thereby to photoelectrons. The first pulse-amplitude signal SP1 corresponding to the received γ-ray energy is output to the first amplifier 15. The first amplifier 15 amplifies the first pulse-amplitude signal SP1 to output the first amplified pulse-amplitude signal ASP1 to the timing determiner 19A.

Concurrently, the scattered γ-ray enters the second scintillator 13 and transfers the energy to electrons by photoelectric effect or Compton scattering.

Each electron, receiving the energy from the scattered γ-ray, moves inside the second scintillator 13 and generates a photon when coupling with a hole. The generated photons are output from the exit surface 13o of the second scintillator 13, incident on the second photomultiplier tube 14, and photo-electrically converted thereby to photoelectrons. As a result, a second pulse-amplitude signal SP2 is output to the second amplifier 16.

The second amplifier 16 amplifies the second pulse-amplitude signal SP2 to output the second amplified pulse-amplitude signal ASP2 to the timing determiner 19A.

Figure 7:
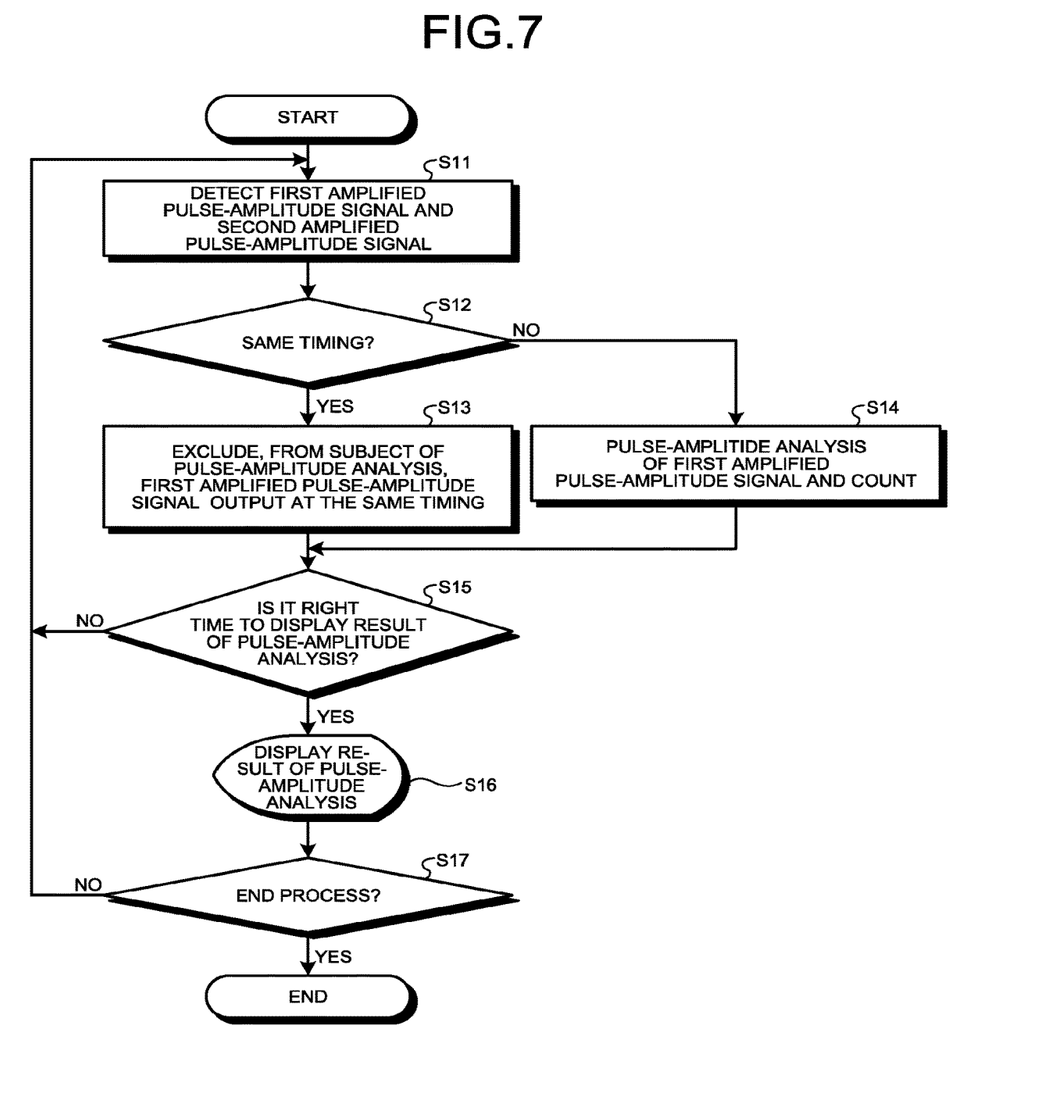
FIG. 7 is a flowchart of the operation of a multi-channel analyzer.

FIG. 7 is a flowchart of the operation of the timing determiner and the multi-channel analyzer.

The timing determiner 19A first detects the first amplified pulse-amplitude signal ASP1 and the second amplified pulse-amplitude signal ASP2 (Step S11).

The timing determiner 19A determines whether the output timing of the first amplified pulse-amplitude signal ASP1 and the output timing of the second amplified pulse-amplitude signal ASP2 coincide with each other (Step S12).

After determining in Step S12 that the output timing of the first amplified pulse-amplitude signal ASP1 and the output timing of the second amplified pulse-amplitude signal ASP2 coincide with each other (Yes in Step S12), the timing determiner 19A determines that the first amplified pulse-amplitude signal ASP1 occurs from Compton scattering. The timing determiner 19A then excludes, from subjects of the pulse-amplitude analysis, the first amplified pulse-amplitude signal ASP1 output at the same timing as the second amplified pulse-amplitude signal ASP2, and inhibits the output of the first amplified pulse-amplitude signal ASP1 to the multi-channel analyzer 18A (Step S13), proceeding to Step S15.

After determining in Step S12 that the first amplified pulse-amplitude signal ASP1 is not output at the same timing as the second amplified pulse-amplitude signal ASP2 (No in Step S12), the timing determiner 19A determines that the first amplified pulse-amplitude signal ASP1 is not attributable to Compton scattering, that is, attributable to photoelectric effect. The timing determiner 19A outputs the first amplified pulse-amplitude signal ASP1 to the multi-channel analyzer 18A as a subject of the pulse-amplitude analysis. A multi-channel analyzer 18A performs multi-channel analysis of the signal for count (Step S14).

The timing determiner 19A then determines whether a certain pulse-amplitude analysis period has elapsed and it is the right time to display a result of the pulse-amplitude analysis (Step S15).

After determining in Step S15 that the certain pulse-amplitude analysis period has not elapsed and it is not the right time to display a result of the pulse-amplitude analysis (No in Step S15), the timing determiner 19A returns to Step S11 for continuing the pulse-amplitude analysis, and repeats the above-described operation (Step S11 to Step S15).

After determining in Step S15 that the certain pulse-amplitude analysis period has elapsed and it is the right time to display a result of the pulse-amplitude analysis (Yes in Step S15), the timing determiner 19A displays a result of wave-form analysis in certain format (Step S16), and determines whether to end the operation (Step S17).

As a result, the multi-channel analyzer 18A determines the first amplified pulse-amplitude signal concurrently output with the second amplified pulse-amplitude signal to be a pulse-amplitude signal occurring from Compton scattering, and excludes the first amplified pulse-amplitude signal from subjects of the pulse-amplitude analysis (refrains from counting the first amplified pulse-amplitude signal).

In other words, the first amplified pulse-amplitude signals as a subject of the pulse-amplitude analysis do not result from photons with inconstant energy by Compton scattering, which makes it possible to relatively reduce the count of first pulse-amplitude signals due to Compton scattering, that is, the count of Compton continuums and Compton edges.

Thus, the γ-ray detector can relatively increase the count of other photoelectric peaks hidden by the count of the Compton continuums CC or the Compton edges CE, and identify the photoelectric peaks.

[3] Third Embodiment

A third embodiment is now described.

Figure 8:
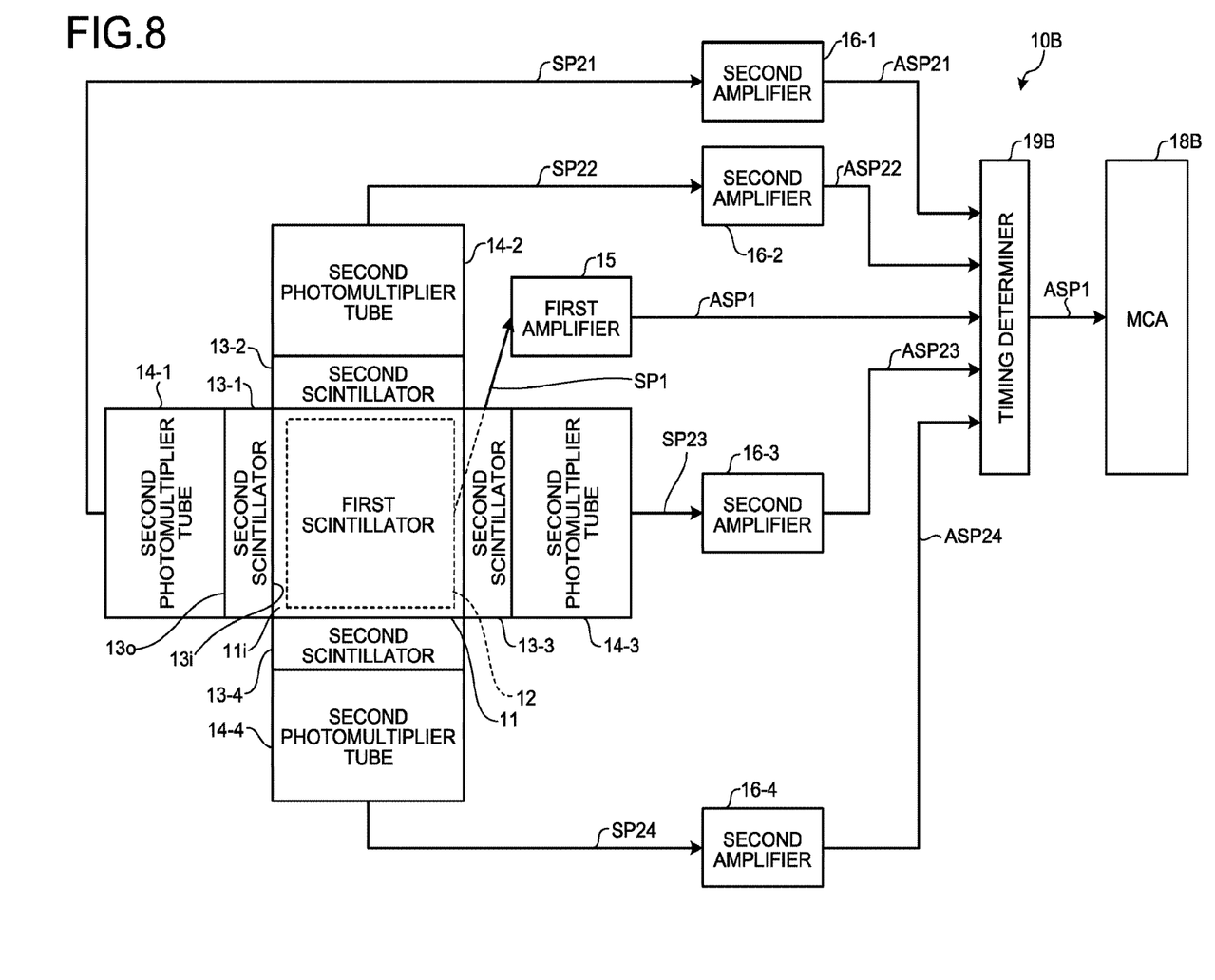
FIG. 8 is a schematic configuration block diagram of a γ-ray detector as an electromagnetic radiation detector according to a third embodiment.

FIG. 8 is a schematic configuration block diagram of a γ-ray detector being an electromagnetic radiation detector in the third embodiment. In FIG. 8, the same or like elements as those in FIG. 1 are denoted by the same reference numerals.

The γ-ray detector in FIG. 8 differs from the first embodiment in FIG. 1 in additionally including second scintillators 13-1 to 13-4 with incidence surfaces 13i located on the peripheral surfaces of the first scintillator 11 except for the incidence surface 11i and the exit surface 11o; second photomultiplier tubes 14-1 to 14-4 located on exit surfaces 13o of the second scintillators 13-1 to 13-4; and a timing determiner 19B that determines, from the output of the second amplifiers 16-1 to 16-4, whether each first amplified pulse-amplitude signal output from the first amplifier 15 is adoptable.

In the following the first scintillator 11 is assumed to have a quadrangular prism shape and four peripheral surfaces in addition to the incidence surface 11i and the exit surface 11o for the purpose of better understanding. In this case an incident γ-ray γi is incident from the front side to the back side of the drawing in FIG. 8, and the first photomultiplier tube 12 is disposed behind the first scintillator 11.

A γ-ray detector 10B includes the first scintillator 11 having the incidence surface 11i and the exit surface 11o to receive a γ-ray being electromagnetic radiation on the incidence surface 11i, emit light by the ionization of the γ-ray, and output photons from the exit surface 11o; the first photomultiplier tube 12 that photoelectrically converts the photons output from the exit surface 11o of the first scintillator 11 into photoelectrons and multiplies electrons to generate and output a first pulse-amplitude signal; the second scintillator 13-1 configured not to allow transmission of visible light generated by the first scintillator 11 and having the incidence surface 13i opposing a first periphery of the first scintillator 11, and an exit surface 13o, the second scintillator 13-1 that receives, on the incidence surface 13i, a scattered γ-ray generated from Compton scattering of an γ-ray by the first scintillator 11 and emits light by ionization and output photons from the exit surface 13o; the second scintillator 13-2 configured not to allow transmission of visible light generated by the first scintillator 11 and having an incidence surface 13i opposing a second periphery of the first scintillator 11, and an exit surface 13o, the second scintillator 13-1 that receives, on the incidence surface 13i, a scattered γ-ray generated from Compton scattering of a γ-ray by the first scintillator 11, emits light by ionization, and outputs photons from the exit surface 13o; the second scintillator 13-3 configured not to allow transmission of visible light generated by the first scintillator 11 and having the incidence surface 13i opposing a third periphery of the first scintillator 11, and the exit surface 13o, the second scintillator 13-1 that receives, on the incidence surface 13i, a scattered γ-ray generated from Compton scattering of a γ-ray by the first scintillator 11, emits light by ionization, and output photons from the exit surface 13o; and the second scintillator 13-4 configured not to allow transmission of visible light generated by the first scintillator 11 and having the incidence surface 13i opposing a fourth periphery of the first scintillator 11, and the exit surface 13o, the second scintillator 13-1 that receives, on the incidence surface 13i, a scattered γ-ray generated from Compton scattering of a γ-ray by the first scintillator 11, emits light by ionization, and outputs photons from the exit surface 13o.

The γ-ray detector 10B further includes the second photomultiplier tube 14-1 that photoelectrically converts photons output from the exit surface 13o of the second scintillator 13-1 into photoelectrons and multiplies electrons (i.e., current amplification) to generate and output a second pulse-amplitude signal SP21; the second photomultiplier tube 14-2 that photoelectrically converts photons output from the exit surface 13o of the second scintillator 13-2 into photoelectrons and multiplies electrons (i.e., current amplification) to generate and output a second pulse-amplitude signal SP22; the second photomultiplier tube 14-3 that photoelectrically converts photons output from the exit surface 13o of the second scintillator 13-3 into photoelectrons and multiplies electrons (i.e., current amplification) to generate and output a second pulse-amplitude signal SP23; and the second photomultiplier tube 14-4 that photoelectrically converts photons output from the exit surface 13o of the second scintillator 13-4 into photoelectrons and multiplies electrons (i.e., current amplification) to generate and output a second pulse-amplitude signal SP24.

In the above structure, to form the second scintillators 13-1 to 13-4 not to allow transmission of visible light generated by the first scintillator 11, scintillator powder is turned into paste, and the paste is solidified into a thick film through compression and drying. Thereby, the second scintillators 13-1 to 13-4 with no transmission of visible light can be attained.

Alternatively, a reflective material that transmits electromagnetic radiation (herein, a γ-ray) and reflects visible light or a non-transmissive material that transmits electromagnetic radiation and transmits no visible light may be placed between each of the second scintillators 13-1 to 13-4 and the first scintillator 11.

The γ-ray detector 10B further includes the first amplifier 15 that amplifies a first pulse-amplitude signal SP1 to output a first amplified pulse-amplitude signal; the second amplifier 16-1 that amplifies the second pulse-amplitude signal output by the second scintillator 13-1 to output a second amplified pulse-amplitude signal; the second amplifier 16-2 that amplifies the second pulse-amplitude signal output by the second scintillator 13-2 to output a second amplified pulse-amplitude signal; the second amplifier 16-3 that amplifies the second pulse-amplitude signal output by the second scintillator 13-3 to output a second amplified pulse-amplitude signal; the second amplifier 16-4 that amplifies the second pulse-amplitude signal output by the second scintillator 13-4 to output s second amplified pulse-amplitude signal; the timing determiner 19B that determines, from the output of the second amplifiers 16-1 to 16-4, whether the first amplified pulse-amplitude signal output from the first amplifier 15 is adoptable; and a multi-channel analyzer 18B that performs multi-channel analysis of the adopted first amplified pulse-amplitude signal.

In the above structure, the first scintillator 11, the first photomultiplier tube 12, and the first amplifier 15 constitute a first scintillation detector, and the second scintillators 13-X (X: 1 to 4), the second photomultiplier tubes 14-X, and the second amplifiers 16-X constitute respective second scintillation detectors.

The operation of the γ-ray detector in the third embodiment is now described.

A γ-ray being electromagnetic radiation is incident on the incidence surface 11i of the first scintillator 11 of the γ-ray detector 10B, causes photoelectric effect or Compton scattering inside the first scintillator 11, and consumes all the energy including the one after Compton scattering by transferring the energy to other electrons therein. In such a case, photons are generated. The photons are output from the exit surface 11o of the first scintillator 11, incident on the first photomultiplier tube 12, and photoelectrically converted thereby to photoelectrons. Thereby, a first pulse-amplitude signal corresponding to a total absorption peak is output to the first amplifier 15.

In this process, the incident γ-ray causes Compton scattering inside the first scintillator to transfer part of the energy and flick out electrons. As a result, the γ-ray is scattered to become a scattered γ-ray and enters any of the second scintillators 13-1 to 13-4 depending on the scattering direction.

Each electron, receiving the γ-ray energy as a result of Compton scattering, moves inside the first scintillator 11 and generates a photon when coupling with a hole. The generated photons are output from the exit surface 11o of the first scintillator 11, incident on the first photomultiplier tube 12, and photoelectrically converted thereby to photoelectrons. Thereby, the first pulse-amplitude signal SP1 corresponding to the received energy of the γ-ray is output to the first amplifier 15. The first amplifier 15 amplifies the first pulse-amplitude signal SP1 to output a first amplified pulse-amplitude signal ASP1 to the timing determiner 19B.

In parallel with this process, the scattered γ-ray is incident on the second scintillators 13-1 to 13-4 and transfers energy to electrons by photoelectric effect or Compton scattering.

Each electron, receiving the energy from the scattered γ-ray, moves inside the second scintillators 13-1 to 13-4, and generates a photon when coupling with a hole. The generated photons are output from the respective exit surfaces 13o of the second scintillators 13-1 to 13-4, incident on the corresponding second photomultiplier tubes 14-1 to 14-4, and photoelectrically thereby converted to photoelectrons, to generate and output the second pulse-amplitude signals SP21 to SP24 to the corresponding second amplifiers 16-1 to 16-4.

The second amplifier 16-1 amplifies the second pulse-amplitude signal SP21 to output a second amplified pulse-amplitude signal ASP21 to the timing determiner 19B.

Likewise, the second amplifier 16-2 amplifies the second pulse-amplitude signal SP22 to output a second amplified pulse-amplitude signal ASP22 to the timing determiner 19B. The second amplifier 16-3 amplifies the second pulse-amplitude signal SP23 to output a second amplified pulse-amplitude signal ASP23 to the timing determiner 19B. The second amplifier 16-4 amplifies the second pulse-amplitude signal SP24 to output a second amplified pulse-amplitude signal ASP24 to the timing determiner 19B.

Consequently, the timing determiner 19B determines whether the output timing of the first amplified pulse-amplitude signal ASP1 coincides with that of any of the second amplified pulse-amplitude signals ASP21 to ASP24 (Step S12).

After determining in Step S12 that the output timing of the first amplified pulse-amplitude signal ASP1 matches that of any of the second amplified pulse-amplitude signals ASP21 to ASP24 (Yes in Step S12), the timing determiner 19B determines that the first amplified pulse-amplitude signal ASP1 occurs from Compton scattering. The timing determiner 19B then excludes, from the subjects of the pulse-amplitude analysis, the first amplified pulse-amplitude signal ASP1 output concurrently with one of the second amplified pulse-amplitude signals ASP21 to ASP24, and proceeds to Step S15 without transmitting the first amplified pulse-amplitude signal ASP1 to the multi-channel analyzer 18B (Step S13).

After determining in Step S12 that the output timing of the first amplified pulse-amplitude signal ASP1 does not match that of all of the second amplified pulse-amplitude signals ASP21 to ASP24 (No in Step S12), the timing determiner 19B determines that the first amplified pulse-amplitude signal ASP1 occurs not from Compton scattering but from photoelectric effect or else. The timing determiner 19B then outputs the first amplified pulse-amplitude signal ASP1 to the multi-channel analyzer 18B as a subject of the pulse-amplitude analysis.

Consequently, the first amplified pulse-amplitude signal ASP1 output concurrently with any of the second amplified pulse-amplitude signals ASP21 to ASP24 is excluded from the subjects of the pulse-amplitude analysis. The multi-channel analyzer 18B performs multi-channel analysis of the first amplified pulse-amplitude signals ASP1 that have been output non-concurrently with all the second amplified pulse-amplitude signals ASP21 to ASP24, and counts such first amplified pulse-amplitude signals ASP1 (Step S14).

Thus, the first amplified pulse-amplitude signals ASP1, as determined to be a subject of the pulse-amplitude analysis, do not correspond to photons having inconstant energy due to Compton scattering. This makes it possible to relatively reduce the count of the first pulse-amplitude signals SP1 attributable to Compton scattering and detected in various directions, more specifically, the count of the Compton continuums CC and the Compton edges CE.

That is, the γ-ray detector according to the third embodiment can detect the timing at which the scattered γ-ray has occurred regardless of the direction of a scattered γ-ray due to Compton scattering, and can relatively increase the count of other photoelectric peaks hidden by the count of Compton continuums, to further ensure identification of the photoelectric peaks than in the second embodiment.

[4] Modification of Embodiments

The above embodiments have illustrated the first scintillator 11 of a quadrangular prism shape by way of example. However, the first scintillator 11 may have any shape such as a multi-angular prism (three or more angular prism), a columnar shape, or a spherical shape as long as one or more sets of the second scintillators and the second photomultiplier tubes are placeable to be able to detect scattered electromagnetic radiation.

In the third embodiment, the timing determiner 19B of the multi-channel analyzer 18B is configured to determine whether the output timing of the first pulse-amplitude signal SP1, being a result of the detection by the first scintillator 11 and the first photomultiplier tube 12, coincides with that of any of the second pulse-amplitude signals SP21 to SP24, being results of the detection by the second scintillators 13-1 to 13-4 and the second photomultiplier tubes 14-1 to 14-4. However, as in the first embodiment, a gating circuit to which the second pulse-amplitude signals SP21 to SP24 are input can be provided to interrupt the output of the first photomultiplier tube 12.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electromagnetic radiation detector comprising:
a first scintillation detector detecting an incidence of electromagnetic radiation, the first scintillation detector including a first scintillator that outputs photons in response to the incidence of electromagnetic radiation;
a second scintillation detector that detects scattered electromagnetic radiation exiting out of the first scintillator that occurs inside the first scintillator due to Compton scattering of the electromagnetic radiation; and
a multi-channel analyzer that performs multi-channel analysis of a first result of the detection by the first scintillation detector without performing the multi-channel analysis of a second result of the detection by the first scintillation detector, a timing of the second result being considered to coincide with a timing of the detection of the scattered electromagnetic radiation exiting out of the first scintillator by the second scintillation detector, wherein
the second scintillation detector comprises a second scintillator that is located adjacent to the first scintillator,
a reflective material that transmits electromagnetic radiation and reflects visible light or a non-transmissive material that transmits electromagnetic radiation and transmits no visible light is placed between the second scintillator and the first scintillator so as to not allow transmission of visible light generated by the first scintillator, and
the second scintillator outputs photons in response to an incidence of the scattered electromagnetic radiation from the first scintillator that occurs inside the first scintillator due to the Compton scattering.

2. The electromagnetic radiation detector according to claim 1, wherein
the first scintillation detector comprises:
a first photomultiplier tube that photoelectrically converts the photons output from the first scintillator to output a first pulse-amplitude signal and a second pulse-amplitude signal, and
a first amplifier that amplifies the first pulse-amplitude signal to output a first amplified pulse-amplitude signal as the first result of the detection and amplifies the second pulse-amplitude signal to output a second amplified pulse-amplitude signal as the second result of the detection,
the second scintillation detector comprises:
a second photomultiplier tube that photoelectrically converts the photons output from the second scintillator to output a third pulse-amplitude signal, and
a second amplifier that amplifies the third pulse-amplitude signal to output a third amplified pulse-amplitude signal, and
the multi-channel analyzer performs the multi-channel analysis of the first amplified pulse-amplitude signal as the first result of the detection without performing the multi-channel analysis of the second pulse-amplitude signal considered to have been output at a same timing as the third pulse-amplitude signal.

3. The electromagnetic radiation detector according to claim 2, further comprising:
a timing determiner that:
is located upstream of the multi-channel analyzer,
determines, from inputs of the second amplified pulse-amplitude signal and the third amplified pulse-amplitude signal, whether the second pulse-amplitude signal and the third pulse-amplitude signal are considered to have been output at the same timing,
outputs the first amplified pulse-amplitude signal,
excludes output of the second pulse-amplitude signal considered to have been output at the same timing as the third pulse-amplitude signal, and
wherein the multi-channel analyzer performs the multi-channel analysis of the first amplified pulse-amplitude signal output from the timing determiner.

4. The electromagnetic radiation detector according to claim 2, comprising:
a plurality of sets of second scintillators, second photomultiplier tubes, and second amplifiers, the second photomultiplier tubes and the second amplifiers corresponding to the second scintillators; and
a timing determiner that:
is located upstream of the multi-channel analyzer,
determines, from inputs of the second amplified pulse-amplitude signal and a plurality of third amplified pulse-amplitude signals, whether the second pulse-amplitude signal is considered to have been output at the same timing as each of third pulse-amplitude signals,
outputs the first amplified pulse-amplitude signal, and
excludes output of the second pulse-amplitude signal considered to have been output at the same timing as any of the third pulse-amplitude signals,
wherein the multi-channel analyzer performs the multi-channel analysis of the first amplified pulse-amplitude signal output from the timing determiner.

5. The electromagnetic radiation detector according to claim 1, wherein the electromagnetic radiation includes an X-ray or a γ-ray.

6. The electromagnetic radiation detector according to claim 1, wherein
the first scintillation detector comprises a first photomultiplier tube that photoelectrically converts the photons output from the first scintillator to output a first pulse-amplitude signal,
the second scintillation detector comprises:
a second photomultiplier tube that photoelectrically converts the photons output from the second scintillator to output a second pulse-amplitude signal, and
a second amplifier that amplifies the second pulse-amplitude signal to output a second amplified pulse-amplitude signal, and
the electromagnetic radiation detector further comprises a gating circuit that interrupts output of the first photomultiplier tube in response to the output of the second pulse-amplitude signal.

* * * * *